United States Patent
Si et al.

(10) Patent No.: US 9,862,912 B2
(45) Date of Patent: ***Jan. 9, 2018

(54) CLEANING COMPOSITIONS CONTAINING CATIONIC POLYMERS, AND METHODS OF MAKING AND USING SAME

(71) Applicant: The Procter & Gamble Company, Cincinnati, OH (US)

(72) Inventors: Gang Si, Beijing (CN); Peng Qin, Beijing (CN); Qi Zhang, Beijing (CN); Stefano Scialla, Rome (IT); Susanne Birkel, Darmstadt (DE); Dongyan Qin, Beijing (CN); Ming Tang, Beijing (CN); Mark Robert Sivik, Cincinnati, OH (US); Rajan Keshav Panandiker, West Chester, OH (US); Christine Mendera, Dannstadt-Schauernheim (DE); Aaron Flores-Figueroa, Mannheim (DE); Hui Ge, Shanghai (CN)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/848,596

(22) Filed: Sep. 9, 2015

(65) Prior Publication Data

US 2015/0376552 A1    Dec. 31, 2015

Related U.S. Application Data

(63) Continuation of application No. PCT/CN2015/074145, filed on Mar. 13, 2015, which is a continuation-in-part of application No. PCT/CN2015/072994, filed on Feb. 13, 2015, which is a continuation-in-part of application No. PCT/CN2014/074122, filed on Mar. 26, 2014, which is a continuation-in-part of application No. PCT/CN2014/074127, filed on Mar. 26, 2014.

(51) Int. Cl.
| | |
|---|---|
| C11D 1/02 | (2006.01) |
| C11D 1/14 | (2006.01) |
| C11D 1/72 | (2006.01) |
| C11D 3/37 | (2006.01) |
| B08B 3/04 | (2006.01) |
| C08F 226/10 | (2006.01) |
| C08F 220/56 | (2006.01) |
| C11D 3/00 | (2006.01) |
| C11D 1/29 | (2006.01) |

(52) U.S. Cl.
CPC .......... *C11D 3/3776* (2013.01); *C08F 220/56* (2013.01); *C08F 226/10* (2013.01); *C11D 1/29* (2013.01); *C11D 3/0026* (2013.01); *C11D 3/3769* (2013.01); *C11D 3/3773* (2013.01)

(58) Field of Classification Search
CPC .... C11D 1/02; C11D 1/14; C11D 1/72; C11D 3/162; C11D 3/37; C11D 3/3769; B08B 3/04

See application file for complete search history.

(56) References Cited

U.S. PATENT DOCUMENTS

| | | | |
|---|---|---|---|
| 4,454,060 A | 6/1984 | Lai et al. | |
| 5,686,024 A * | 11/1997 | Dahanayake | A61K 8/817 252/3 |
| 5,824,739 A | 10/1998 | Kondo et al. | |
| 6,733,538 B1 | 5/2004 | Panandiker et al. | |
| 7,659,354 B2 | 2/2010 | Song et al. | |
| 8,193,141 B2 | 6/2012 | Corona, III et al. | |
| 8,372,795 B2 | 2/2013 | Corona, III et al. | |
| 8,450,263 B2 | 5/2013 | Panandiker et al. | |
| 8,937,142 B2 | 1/2015 | Panandiker et al. | |
| 2008/0229519 A1 | 9/2008 | Depoot | |
| 2008/0234165 A1 | 9/2008 | Panandiker et al. | |
| 2011/0097294 A1 | 4/2011 | Anthony et al. | |
| 2011/0177994 A1 | 7/2011 | Wahl et al. | |
| 2012/0309663 A1 | 12/2012 | Panandiker et al. | |
| 2014/0020188 A1* | 1/2014 | Gizaw | C11D 3/0036 8/137 |
| 2014/0023609 A1 | 1/2014 | Mukherjee et al. | |
| 2015/0322380 A1 | 11/2015 | Li et al. | |

FOREIGN PATENT DOCUMENTS

| | | | |
|---|---|---|---|
| WO | WO 2005/087907 A1 | 9/2005 | |
| WO | WO 2009/095823 * | 8/2009 | .............. C11D 3/00 |
| WO | WO 2009/095823 A1 | 8/2009 | |
| WO | WO 2011/107397 A1 | 9/2011 | |

OTHER PUBLICATIONS

International Search Report for PCT Application No. PCT/CN2015/074145, dated Jun. 29, 2015, containing 6 pages.
PCT International Search Report for application No. PCT/CN2015/074145, dated Nov. 17, 2016, 15 pages.

* cited by examiner

*Primary Examiner* — Brian P Mruk
(74) *Attorney, Agent, or Firm* — Gregory S. Darley-Emerson; Leonard W. Lewis; Steven W. Miller

(57) ABSTRACT

The present invention relates to cleaning composition, preferably a laundry detergent composition, comprising a cationic polymer capable of improving the overall sudsing profile of such cleaning composition.

20 Claims, No Drawings

CLEANING COMPOSITIONS CONTAINING CATIONIC POLYMERS, AND METHODS OF MAKING AND USING SAME

FIELD OF THE INVENTION

The present invention relates to cleaning compositions, and in particular it relates to a laundry detergent composition, preferably a liquid laundry detergent composition, that comprising a cationic polymer in an effective amount for optimizing sudsing profile. The present invention also relates to methods of making and using such cleaning compositions.

BACKGROUND OF THE INVENTION

Sudsing profile is important for a cleaning composition, particularly laundry detergent, where the appropriate volume and speed of suds formation, retention and dissolution in the wash and rinse cycles are considered key benchmarks of performance by the consumers. For laundry detergents, while a sudsing profile is important for machine washing process, it is even more important in a typical hand-washing process as the consumer would see changes in the suds level in the wash and rinse cycles. Typically, consumers, particularly hand-washing consumers, desire laundry detergent that dissolves in the wash liquor to give voluminous suds during the wash cycle to signify sufficient performance. The suds are then carried over to the rinse solution and require additional time, water and labor to thoroughly rinse from the laundered fabric.

However, reducing the suds level overall is not a viable option because when the consumer sees little or no suds during the washing cycle, it causes the consumer to believe that the laundry detergent is not as active. In addition, the current market demands are for laundry detergents with improved environmental sustainability (e.g., less water consumption) without negatively impacting cleaning performance or the perception of cleaning performance (i.e., appearance of suds on fabric or in the rinse solution). This, of course, reinforces the preference for laundry detergents having improved foam control composition for faster suds dissolution during the rinse cycle so as to reduce extra rinse cycles needed to remove the suds from the cleaned fabrics/rinse solution. Thus, there is a need for a cleaning composition having a sudsing profile where there is strong level of suds volume during the washing cycle, and yet quickly collapses in the rinsing solution for substantially reduced or zero suds for cost savings and environmental conservation purposes. This is known as the "single rinse" concept.

One solution has been to add a de-foaming agent during the rinse cycles, but this option is cost prohibitive for most hand-washing consumers. Additionally, the prior art discloses laundry detergent compositions with various foam-control or anti-foaming agents in an attempt to address this problem. For example, PCT Publication No. WO2011/107397 (Unilever) discloses a laundry detergent composition comprising a delayed-release amino-silicone based anti-foaming agent that is absorbed onto a carrier or filler to act in the rinsing cycle to reduce or eliminate suds, preferably after two rinse cycles. However, the suds control benefit imparted by such amino-silicone based anti-foaming agent may still come at the expense of wash suds, i.e., the wash suds volume can be significantly reduced since the silicone release timing is difficult to control. Inopportune release of the silicone anti-foam may lead to significant reduction of wash suds volume, which will give consumer the impression that the detergent composition contains lower surfactant level and is therefore of lower quality/value. EP Publication No. EP0685250A1 (Dow Corning) discloses a foam control composition for use in laundry detergents that inhibits the formation of new suds during the post-wash rinsing cycles, but which does not appear to quicken the elimination of already existing suds carried over from the wash cycle.

Accordingly, there is a need for a cleaning composition, preferably a laundry detergent composition, which enables strong suds formation (both fast generation of large volume of suds as well as stability or sustainability of the suds already generated over time) during the wash cycle while reducing and eliminating the suds quickly during the rinse cycle(s), preferably across a range of consumer wash habits and fabric/material surfaces being washed, so that a single rinse cycle might be sufficient to remove the suds, thereby enabling the "single rinse" concept.

Further, conventional de-foaming or anti-foaming agents, especially the polymeric de-foaming or anti-foaming agents, are known to cause significant whiteness loss in fabrics after repeated wash cycles, i.e., the grey or dull color in fabrics that have been exposed to many wash cycles. Therefore, the usage of such polymeric de-foaming or anti-foaming agents has been limited in laundry detergent compositions. Correspondingly, it will be an advantage for laundry detergent compositions to also have reduced whiteness loss in fabrics after repeated wash.

SUMMARY OF THE INVENTION

The present invention relates to a laundry detergent composition which exhibits significant suds reduction during the rinse cycle while minimizing reduction of suds volume during the wash cycle, and at the same time leading to less fabric whiteness loss after repeated washing. It has now been discovered that the challenges presented hereinabove for conventional laundry detergents can be met by using cationic polymers containing (meth)acrylamide (AAm), a cationic monomeric unit, and optionally a nonionic monomeric unit (which is not AAm) at a specific monomeric ratio and having a molecular weight within a specific range. The cationic polymers of the present invention have shown outstanding sudsing profile with no or little fabric whiteness loss.

In one aspect, the present invention relates to a laundry detergent composition, containing an effective amount of a cationic polymer for sudsing profile optimization, such cationic polymer including: (i) from about 10 mol % to about 70 mol % of a first nonionic structural unit derived from (meth)acrylamide (AAm); (ii) from about 5 mol % to about 40 mol % of a second cationic structural unit; (iii) from about 5 mol % to about 60 mol % of a third nonionic structural unit that is different from the first nonionic structural unit, and (iv) optionally, from 0 mol % to 20 mol % of at least one additional structural unit that is different from the first, second and third structural unit, while the total mol % of (i)-(iv) adds up to 100 mol %, and while the cationic polymer is characterized by a molecular weight (Mw) ranging from 15,000 to 1,000,000 Daltons and is substantially free of any silicone-derived structural unit.

The laundry detergent composition of the present invention may contain, in addition to the cationic polymer, one or more anionic surfactants. The anionic surfactants may be present in an amount ranging from 1 wt % to 50 wt %, and are preferably selected from the group consisting of $C_{10}$-$C_{20}$ linear alkyl benzene sulphonates, $C_{10}$-$C_{20}$ linear or branched alkylalkoxy sulfates having an average degree of alkoxylation ranging from 0.1 to 5.0, $C_{10}$-$C_{20}$ linear or branched alkyl sulfates, $C_{10}$-$C_{20}$ linear or branched alkyl ester sulfates, $C_{10}$-$C_{20}$ linear or branched alkyl sulphonates, $C_{10}$-$C_{20}$ linear or branched alkyl ester sulphonates, $C_{10}$-$C_{20}$ linear or branched alkyl phosphates, $C_{10}$-$C_{20}$ linear or branched alkyl phosphonates, $C_{10}$-$C_{20}$ linear or branched alkyl carboxylates, and combinations thereof.

The second cationic structural unit is preferably derived or made from a monomer selected from the group consisting of diallyl dimethyl ammonium salts (DADMAS), N,N-dimethyl aminoethyl acrylate, N,N-dimethyl aminoethyl methacrylate (DMAM), [2-(methacryloylamino)ethyl]trimethylammonium salts, N,N-dimethylaminopropyl acrylamide (DMAPA), N,N-dimethylaminopropyl methacrylamide (DMAPMA), acrylamidopropyl trimethyl ammonium salts (APTAS), methacrylamidopropyl trimethylammonium salts (MAPTAS), quaternized vinylimidazole (QVi), and combinations thereof. More preferably, the second cationic structural unit of the cationic polymer is derived or made from diallyl dimethyl ammonium chloride (DADMAC).

The third nonionic structural unit is preferably derived or made from a monomer selected from the group consisting of vinylpyrrolidone (VP), vinyl acetate, vinyl alcohol, vinyl formamide, vinyl acetamide, vinyl alkyl ether, vinyl pyridine, vinyl imidazole, vinyl caprolactam, and combinations thereof. More preferably, the third nonionic structural unit of the cationic polymer is derived from VP.

The cationic polymer of the present invention may further comprise a fourth anionic structural unit in the amount of from 0 mol % to about 20 mol %, while said fourth anionic structural unit is preferably derived from vinyl carboxylic acids and anhydrides thereof. Note that the incorporation of said fourth anionic structural unit does not change the overall cationic characteristic of the polymer, i.e., the total anionic charge carried by said fourth anionic structural unit is less than the total cationic charge carried by the second cationic structural unit, so that the total charge of the polymer still turns out to be cationic.

In one specific embodiment of the present invention, the cationic polymer comprises: (i) from about 15 mol % to about 60 mol % of the first nonionic structural unit; (ii) from about 10 mol % to about 40 mol % of the second cationic structural unit; and (iii) from about 20 mol % to about 55 mol % of the third nonionic structural unit. Preferably but not necessarily, the cationic polymer of the present invention consists essentially of the above-described structural units.

The molecular weight of the cationic polymer, i.e., the weight average molecular weight, preferably ranges from about 15,000 to about 1,000,000 Daltons, more preferably from about 20,000 to about 500,000 Daltons, and most preferably from about 20,000 to about 250,000 Daltons.

The cationic polymer may be present in the laundry detergent composition in any amount that is sufficient to impart a sudsing benefit, i.e., either increased wash suds volume or decreased rinse suds volume or both in comparison with a similar laundry detergent composition that does not contain said cationic polymer. Preferably, the cationic polymer is present in an amount ranging from about 0.01 wt % to about 15 wt %, preferably from about 0.05 wt % to about 10 wt %, more preferably from about 0.1 wt % to about 5 wt %, and most preferably from about 0.2 wt % to about 1 wt %.

In another aspect, the present invention relates to the use of a laundry detergent composition as described hereinabove, preferably for hand-washing fabrics to achieve optimized sudsing profile and minimal whiteness loss. The optimized sudsing profile can be characterized by: (1) a Wash Suds Index (WSI) of more than 100%, preferably more than 105%, and more preferably more than 110%; and (2) a Rinse Suds Index (RSI) of less than 50%, preferably less than 45%, and more preferably less than 40%, as determined by the Sudsing Profile Test described hereinafter.

In yet another aspect, the present invention relates to a liquid laundry detergent composition that contains:
(1) from about 0.2 wt % to about 1 wt % of a cationic polymer having a molecular weight of from about 20,000 to about 250,000 Daltons, said cationic polymer consisting essentially of: (i) from about 15 mol % to about 60 mol % of a first nonionic structural unit derived from (meth)acrylamide (AAm); (ii) from about 10 mol % to about 40 mol % of a second cationic structural unit derived from diallyl dimethyl ammonium chloride (DADMAC); (iii) from about 20 mol % to about 55 mol % of a third nonionic structural unit derived from vinylpyrrolidone (VP); and (iv) from 0 mol % to about 10 mol % of a fourth anionic structural unit derived from (meth)acrylic acid (AA), maleic acid (MA) and anhydride thereof; and
(2) from about 1 wt % to about 50 wt % of one or more anionic surfactants selected from the group consisting of $C_{10}$-$C_{20}$ linear or branched alkylalkoxy sulfates having an average degree of alkoxylation ranging from about 0.5 to about 3 and combinations thereof.

These and other features of the present invention will become apparent to one skilled in the art upon review of the following detailed description when taken in conjunction with the appended claims.

DETAILED DESCRIPTION OF THE INVENTION

Definitions

As used herein, "suds" indicates a non-equilibrium dispersion of gas bubbles in a relatively smaller volume of a liquid. The terms like "suds", "foam" and "lather" can be used interchangeably within the meaning of the present invention.

As used herein, "sudsing profile" refers to the properties of a detergent composition relating to suds character during the wash and rinse cycles. The sudsing profile of a detergent composition includes, but is not limited to, the speed of suds generation upon dissolution in the laundering liquor, the volume and retention of suds in the wash cycle, and the volume and disappearance of suds in the rinse cycle. Preferably, the sudsing profile includes the Wash Suds Index and Rinse Suds Index, as specifically defined by the testing methods disclosed hereinafter in the examples. It may further include additional suds-related parameters, such as suds stability measured during the washing cycle and the like.

As used herein, the term "cleaning composition" means a liquid or solid composition for treating fabrics, hard surfaces and any other surfaces in the area of fabric and home care, and includes hard surface cleaning and/or treatment including floor and bathroom cleaners (e.g., toilet bowl cleaners); hand dishwashing agents or light duty dishwashing agents, especially those of the high-foaming type; machine dishwashing agents; personal care compositions; pet care compositions; automotive care compositions; and household care compositions. In one embodiment, the cleaning composition of the present invention is a hard surface cleaning composition, preferably wherein the hard surface cleaning composition impregnates a nonwoven substrate.

As used herein, the term "laundry detergent composition" is a subset of "cleaning composition", and includes a liquid or solid composition, and includes, unless otherwise indicated, granular or powder-form all-purpose or "heavy-duty" washing agents for fabric, especially cleaning detergents as well as cleaning auxiliaries such as bleach, rinse aids, additives or pre-treat types. In one embodiment, the laundry detergent composition is a solid laundry detergent composition, and preferably a free-flowing particulate laundry detergent composition (i.e., a granular detergent product).

As used herein, the term "cationic polymer" refers to a polymer having a net cationic charge. Such polymer typically contains one or more cationic monomers. It may contain one or more anionic monomers and/or nonionic monomers in addition to the cationic monomers, but the total charge carried by all monomeric units in the polymer is positive (i.e., cationic).

As used herein, "charge density" refers to the net charge density of the polymer itself and may be different from the monomer feedstock. Charge density for a homopolymer may be calculated by dividing the number of net charges per repeating (structural) unit by the molecular weight of the repeating unit. The positive charges may be located on the backbone of the polymers and/or the side chains of polymers. For some polymers, such as those with amine structural units, the charge density depends on the pH of the carrier. For these polymers, charge density is calculated based on the charge of the monomer at pH of 7. Typically, the charge is determined with respect to the polymerized structural unit, not necessarily the parent monomer.

As used herein, the term "Cationic Charge Density" (CCD) means the amount of net positive charge present per gram of the polymer. Cationic charge density (in units of milliequivalents of charge per gram of polymer) may be calculated according to the following equation:

$$CCD = \frac{1000 \times (E2 \times C2 - E4 \times C4)}{C1 \times W1 + C2 \times W2 + C3 \times W3 + C4 \times W4}$$

where: E2 is the molar equivalents of charge of the second cationic structural unit; E4 is the molar equivalents of charge of the fourth anionic structural unit (if any); C2 is the molar percentage of the second cationic structural unit; C4 is the molar percentage of the fourth anionic structural unit (if any); C1 and C3 are the molar percentages of the first and third nonionic structural units; W1, W2, W3, and W4 are the molecular weights of the first nonionic structural unit, the second cationic structural unit, the third nonionic structural unit, and the fourth anionic structural unit (if any), respectively. For example, for an AAm/QVi/VP polymer containing 80 mol % of AAm, 5 mol % of QVi, and 15 mol % of VP respectively, its cationic charge density (meq/g) is calculated as: CCD=$1000 \times E_2 \times C_2/(C_1W_1+C_2W_2+C_3W_3)$, wherein $E_2$=1, $C_1$=80, $C_2$=5, $C_3$=15, $W_1$=71.08, $W_2$=220.25 and $W_3$=111.14. Therefore, the cationic charge density of this copolymer is CCD=$1000 \times 1 \times 5/(80 \times 71.08+5 \times 220.25+15 \times 111.14)$=0.59. For another example, for an AAm/DADMAC/VP/AA polymer containing 76 mol % of AAm, 5 mol % of DADMAC, 15 mol % of VP and 4 mol % of AA respectively, its cationic charge density (meq/g) is calculated as: CCD=$1000 \times (E_2C_2-E_4C_4)/(C_1W_1+C_2W_2+C_3W_3+C_4W_4)$, wherein $E_2$=1, $E_4$=1, $C_1$=76, $C_2$=5, $C_3$=15, $C_4$=4, $W_1$=71.08, $W_2$=161.67, $W_3$=111.14 and $W_4$=72.06. Therefore, the cationic charge density of this copolymer is CCD=$1000 \times [(1 \times 5)-(1 \times 4)]/(76 \times 71.08+5 \times 161.67+15 \times 111.14+4 \times 72.06)$=0.12.

As used herein, the term "molecular weight" refers to the weight average molecular weight of the polymer chains in a polymer composition. Further, the "weight average molecular weight" ("Mw") may be calculated using the equation:

$$Mw=(\Sigma iNiMi^2)/(\Sigma iNiMi)$$

where Ni is the number of molecules having a molecular weight Mi. The weight average molecular weight must be measured by the method described in the Test Methods section.

As used herein "mol %" refers to the relative molar percentage of a particular monomeric structural unit in a polymer. It is understood that within the meaning of the present invention, the relative molar percentages of all monomeric structural units that are present in the cationic polymer shall add up to 100 mol %.

As used herein, the term "derived from" refers to monomeric structural unit in a polymer that can be made from a compound or any derivative of such compound, i.e., with one or more substituents. Preferably, such structural unit is made directly from the compound in issue. For example, the term "structural unit derived from (meth)acrylamide" refers to monomeric structural unit in a polymer that can be made from (meth)acrylamide, or any derivative thereof with one or more substituents. Preferably, such structural unit is made directly from (meth)acrylamide. The term "(meth)acrylamide" refers to either methacrylamide or acrylamide, and it is abbreviated herein as "AAm."

The term "ammonium salt" or "ammonium salts" as used herein refers to various compounds selected from the group consisting of ammonium chloride, ammonium fluoride, ammonium bromide, ammonium iodine, ammonium bisulfate, ammonium alkyl sulfate, ammonium dihydrogen phosphate, ammonium hydrogen alkyl phosphate, ammonium dialkyl phosphate, and the like. For example, the diallyl dimethyl ammonium salts as described herein include, but are not limited to: diallyl dimethyl ammonium chloride (DADMAC), diallyl dimethyl ammonium fluoride, diallyl dimethyl ammonium bromide, diallyl dimethyl ammonium iodine, diallyl dimethyl ammonium bisulfate, diallyl dimethyl ammonium alkyl sulfate, diallyl dimethyl ammonium dihydrogen phosphate, diallyl dimethyl ammonium hydrogen alkyl phosphate, diallyl dimethyl ammonium dialkyl phosphate, and combinations thereof. Preferably but not necessarily, the ammonium salt is ammonium chloride.

As used herein, articles such as "a" and "an" when used in a claim, are understood to mean one or more of what is claimed or described.

As used herein, the terms "comprising," "comprises," "include", "includes" and "including" are meant to be non-limiting. The term "consisting of" or "consisting essentially of" are meant to be limiting, i.e., excluding any components or ingredients that are not specifically listed except when they are present as impurities. The term "substantially free of" as used herein refers to either the complete absence of an ingredient or a minimal amount thereof merely as impurity or unintended byproduct of another ingredient.

As used herein, the term "solid" includes granular, powder, bar and tablet product forms.

As used herein, the term "fluid" includes liquid, gel, paste and gas product forms.

As used herein, the term "liquid" refers to a fluid having a liquid having a viscosity of from about 1 to about 2000 mPa*s at 25° C. and a shear rate of 20 sec$^{-1}$. In some embodiments, the viscosity of the liquid may be in the range of from about 200 to about 1000 mPa*s at 25° C. at a shear rate of 20 sec$^{-1}$. In some embodiments, the viscosity of the liquid may be in the range of from about 200 to about 500 mPa*s at 25° C. at a shear rate of 20 sec$^{-1}$.

All temperatures herein are in degrees Celsius (° C.) unless otherwise indicated. Unless otherwise specified, all measurements herein are conducted at 20° C. and under the atmospheric pressure.

In all embodiments of the present invention, all percentages are by weight of the total composition, unless specifically stated otherwise. All ratios are weight ratios, unless specifically stated otherwise. The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It is understood that the test methods that are disclosed in the Test Methods Section of the present application must be used to determine the respective values of the parameters of Applicants' inventions are described and claimed herein.

Cationic Polymer

The cationic polymer used in the present invention is a terpolymer that contains at least three different types of structural units. The structural units, or monomers, can be incorporated in the cationic polymer in a random format or can be in a blocky format.

In a particularly preferred embodiment of the present invention, such cationic polymer is a terpolymer that contains only the first, second and third structural units as described hereinabove, substantially free of any other structural components. Alternatively, it can include one or more additional structural units (for example, a fourth anionic structural unit) besides the first, second and third structural units described hereinabove.

The first structural unit in the cationic polymer of the present invention is derived from (meth)acrylamide (AAm). Preferably, the cationic polymer contains from about 10 mol % to about 70 mol %, and more preferably from about 15 mol % to about 60 mol %, of the AAm-derived structural unit.

The second structural unit in the cationic polymer is a cationic structural unit that can be derived from any suitable water-soluble cationic ethylenically unsaturated monomer, such as, for example, N,N-dialkylaminoalkyl methacrylate, N,N-dialkylaminoalkyl acrylate, N,N-dialkylaminoalkyl acrylamide, N,N-dialkylaminoalkylmethacrylamide, methacylamidoalkyl trialkylammonium salts, acrylamidoalkyll-trialkylamminium salts, vinylamine, vinyl imidazole, quaternized vinyl imidazole and diallyl dialkyl ammonium salts.

Preferably, the second cationic structural unit is derived from a monomer selected from the group consisting of diallyl dimethyl ammonium salts (DADMAS), N,N-dimethyl aminoethyl acrylate, N,N-dimethyl aminoethyl methacrylate (DMAM), [2-(methacryloylamino)ethyl]tri-methylammonium salts, N,N-dimethylaminopropyl acrylamide (DMAPA), N,N-dimethylaminopropyl methacrylamide (DMAPMA), acrylamidopropyl trimethyl ammonium salts (APTAS), methacrylamidopropyl trimethylammonium salts (MAPTAS), and quaternized vinylimidazole (QVi).

More preferably, the second cationic structural unit is derived from a diallyl dimethyl ammonium salt (DADMAS), as described hereinabove.

Alternatively, the second cationic structural unit can be derived from a [2-(methacryloylamino)ethyl]tri-methylammonium salt, such as, for example, [2-(methacryloylamino) ethyl]tri-methylammonium chloride, [2-(methacryloylamino)ethyl]tri-methylammonium fluoride, [2-(methacryloylamino)ethyl]tri-methylammonium bromide, [2-(methacryloylamino)ethyl]tri-methylammonium iodine, [2-(methacryloylamino)ethyl]tri-methylammonium bisulfate, [2-(methacryloylamino)ethyl]tri-methylammonium alkyl sulfate, [2-(methacryloylamino)ethyl]tri-methylammonium dihydrogen phosphate, [2-(methacryloylamino) ethyl]tri-methylammonium hydrogen alkyl phosphate, [2-(methacryloylamino)ethyl]tri-methylammonium dialkyl phosphate, and combinations thereof.

Further, the second cationic structural unit can be derived from APTAS, which include, for example, acrylamidopropyl trimethyl ammonium chloride (APTAC), acrylamidopropyl trimethyl ammonium fluoride, acrylamidopropyl trimethyl ammonium bromide, acrylamidopropyl trimethyl ammonium iodine, acrylamidopropyl trimethyl ammonium bisulfate, acrylamidopropyl trimethyl ammonium alkyl sulfate, acrylamidopropyl trimethyl ammonium dihydrogen phosphate, acrylamidopropyl trimethyl ammonium hydrogen alkyl phosphate, acrylamidopropyl trimethyl ammonium dialkyl phosphate, and combinations thereof.

Still further, the second cationic structural unit can be derived from a MAPTAS, which includes, for example, methacrylamidopropyl trimethylammonium chloride (MAPTAC), methacrylamidopropyl trimethylammonium fluoride, methacrylamidopropyl trimethylammonium bromide, methacrylamidopropyl trimethylammonium iodine, methacrylamidopropyl trimethylammonium bisulfate, methacrylamidopropyl trimethylammonium alkyl sulfate, methacrylamidopropyl trimethylammonium dihydrogen phosphate, methacrylamidopropyl trimethylammonium hydrogen alkyl phosphate, methacrylamidopropyl trimethylammonium dialkyl phosphate, and combinations thereof.

More preferably, the second cationic structural unit is derived from DADMAC, MAPTAC, APTAC, or QVi. Most preferably, the second cationic structural unit as mentioned herein is made directly from DADMAC. Cationic polymers containing DADMAC show better stability and lower malodor release in finish products after long shelf time, versus polymers containing other cationic monomers.

The second cationic structural unit is preferably present in the cationic polymer in an amount ranging from about 5 mol % to about 40 mol %, and more preferably from about 10 mol % to about 40 mol %. An appropriate amount of the second cationic structural unit in the cationic polymer helps to balance the overall cationic charge density of the cationic polymer, which is important for achieving desired sudsing performance and phase stability in the finished detergent products, especially in liquid detergent products.

The third nonionic structural unit is preferably derived from a vinyl-based nonionic monomer, such as vinylpyrrolidone (VP), vinyl acetate, vinyl alcohol, vinyl formamide, vinyl acetamide, vinyl alkyl ether, vinyl pyridine, vinyl imidazole, vinyl caprolactam, and combinations thereof. More preferably, the third nonionic structural unit of the cationic polymer is derived from VP. Cationic polymers with VP in this invention may be especially advantageous in delivering high wash suds. The cationic polymer may contain from about 5 mol % to about 60 mol %, and more preferably from about 20 mol % to about 55 mol %, of the third nonionic structural unit.

The cationic polymer of the present invention may further comprise a fourth anionic structural unit, which is optional, that is derived from a vinyl carboxylic acid or an acid anhydride thereof, such as, for example, (meth)acrylic acid, acrylic anhydride, maleic acid, maleic anhydride, and combinations thereof. The cationic polymer may contain from about 0 mol % to about 20 mol %, more preferably from 0 mol % to about 10 mol %, and most preferably from 0 mol % to about 5 mol %, of the fourth anionic structural unit.

In a specific embodiment of the present invention, the cationic polymer does not contain the fourth anionic structural unit (i.e., the fourth anionic structural unit is present at 0 mol %) or any of additional structural unit. In other words, the cationic polymer of the present invention consists essentially of the first, second, and third structural units as described hereinabove. For example, such cationic polymer can be a terpolymer consisting essentially of: (i) from about 10 mol % to about 70 mol %, preferably from about 15 mol % to about 60 mol % of the AAm-derived first nonionic structural unit; (ii) from about 5 mol % to about 40 mol %, preferably from about 10 mol % to about 40 mol %, of the second cationic structural unit, which is preferably derived from DADMAC; and (iii) from about 5 mol % to about 60 mol %, preferably from about 20 mol % to about 55 mol %, of the third nonionic structural unit, which is preferably derived from VP.

In another specific embodiment of the present invention, the cationic polymer contains also the fourth anionic structural unit but is substantially free of any additional structural unit. In other words, the cationic polymer of the present invention consists essentially of the first, second, third, and fourth structural units as described hereinabove. For example, such cationic polymer can consist essentially of: (i) from about 10 mol % to about 70 mol %, preferably from about 15 mol % to about 60 mol % of the AAm-derived first nonionic structural unit; (ii) from about 5 mol % to about 40 mol %, preferably from about 10 mol % to about 40 mol %, of the second cationic structural unit, which is preferably derived from DADMAC; (iii) from about 5 mol % to about 60 mol %, preferably from about 20 mol % to about 55 mol %, of the third nonionic structural unit, which is preferably derived from VP; and (iv) from about 0.1 mol % to about 20 mol %, preferably from about 0.5 mol % to about 10 mol %, of the fourth anionic structural unit, which is preferably derived from (meth)acrylic acid or anhydride thereof. Presence of the fourth anionic structural unit in an appropriate amount helps to improve hydrophilicity of the cationic polymer, and therefor improving stability of the finished detergent products containing said cationic polymer.

The specific molar percentage ranges of the first, second, third, and optionally fourth structural units of the cationic polymer as specified hereinabove is critical for optimizing the sudsing profile generated by the laundry detergent compositions containing such cationic polymer during the wash and rinse cycles. Further, phase stability of the finished products containing the cationic polymer of the present invention can be impacted by the molar percentage ranges of respective structural units in the cationic polymer, which are also selected carefully to minimize phase separation of the finished products.

Laundry detergent compositions containing the cationic polymer of the present invention are characterized by a sudsing profile defined by: (1) a Wash Suds Index (WSI) of more than about 100%, preferably more than about 105%, and more preferably more than about 110%; and (2) a Rinse Suds Index (RSI) of less than about 50%, preferably less than about 45%, and more preferably less than about 40%, as determined by the Sudsing Profile Test described hereinafter. Specifically, the laundry detergent composition of the present invention has an optimal sudsing profile that is defined by a WSI of more than about 100% and a RSI of less than about 50%, preferably a WSI of more than about 105% and RSI of less than about 45%, and more preferably a WSI of more than about 110% and a RSI of less than about 40%.

The specific molecular weight range for the cationic polymer as specified hereinabove also provides improved sudsing profile. More importantly, such molecular weight range is particularly effective in reducing the whiteness loss that is commonly seen in fabrics after they have been exposed to multiple washes. Cationic polymers have been known to contribute to fabric whiteness loss, which is a limiting factor for wider usage of such polymers. However, inventors of the present invention have discovered that by controlling the molecular weight of the cationic polymer within a specific range, i.e., from about 15,000 to about 1,000,000 Daltons, preferably from about 20,000 to about 500,000 Daltons, more preferably from about 20,000 to about 250,000 Daltons, the fabric whiteness loss can be effectively reduced in comparison with conventional cationic polymers.

Further, finished product rheology can also be impacted by molecular weight of the cationic polymer. Therefore, the molecular weight of the cationic polymer of the present invention is also carefully selected to minimize adverse impact on the finished product rheology.

Cleaning Compositions

The present invention provides a cleaning composition comprising the cationic polymer as mentioned hereinabove. In one aspect, the cleaning composition can be hard surface cleaners, such as for example, dish washing detergents, and those used in the health and beauty areas, including shampoos and soaps, which may benefit from products having improved sudsing profiles. In a preferred aspect of the present invention, the cleaning composition is designed for laundry detergent application, for example: laundry, including automatic washing machine laundering or hand-washing, or cleaning auxiliaries, such as for example, bleach, rinse aids, additives or pre-treat types.

The cleaning or laundry detergent compositions can be in any form, namely, in the form of a liquid; a solid such as a powder, granules, agglomerate, paste, tablet, pouches, bar, gel; an emulsion; types delivered in dual- or multi-compartment containers or pouches; a spray or foam detergent; premoistened wipes (i.e., the cleaning composition in combination with a nonwoven material); dry wipes (i.e., the cleaning composition in combination with a nonwoven materials) activated with water by a consumer; and other homogeneous or multiphase consumer cleaning product forms.

The laundry detergent composition is preferably a liquid laundry detergent and can be a fully formulated laundry detergent product. Liquid compositions contained in encapsulated and/or unitized dose products are included, as are compositions which comprise two or more separate but jointly dispensable portions. More preferably, the laundry detergent composition is a liquid laundry detergent composition designed for hand-washing, where the improved suds benefit or superior sudsing profile is most evident to the consumer. The liquid laundry detergent composition preferably contains water as an aqueous carrier, and it can contain either water alone or mixtures of organic solvent(s) with water as carrier(s). Suitable organic solvents are linear or branched lower $C_1$-$C_8$ alcohols, diols, glycerols or glycols; lower amine solvents such as $C_1$-$C_4$ alkanolamines, and mixtures thereof. Exemplary organic solvents include 1,2-propanediol, ethanol, glycerol, monoethanolamine and triethanolamine. The carriers are typically present in a liquid composition at levels in the range of from about 0.1% to about 98%, preferably from about 10% to about 95%, more preferably from about 25% to about 75% by total weight of the liquid composition. In some embodiments, water is from about 85 to about 100 wt % of the carrier. In other embodiments, water is absent and the composition is anhydrous. Highly preferred compositions afforded by the present invention are clear, isotropic liquids.

The liquid laundry detergent composition of the present invention has a viscosity from about 1 to about 2000 centipoise (1-2000 mPa·s), or from about 200 to about 800 centipoises (200-800 mPa·s). The viscosity can be determined using a Brookfield viscometer, No. 2 spindle, at 60 RPM/s, measured at 25° C.

The amount of the cationic polymer of the present invention in the laundry detergent or cleaning composition is not particularly limited, as long as it is effective for providing an optimal sudsing profile with significant suds volume reduction during the rinse cycle and insignificant suds volume reduction during the wash cycle, which is particularly quantified by a Wash Suds Index (WSI) of more than about 100%, preferably more than about 105%, and more preferably more than about 110%, and a Rinse Suds Index (RSI) of less than about 50%, preferably less than about 45%, and more preferably less than about 40%, as defined by the Sudsing Profile Test described herein.

Preferably but not necessarily, the cationic polymer is provided in the cleaning or laundry detergent composition at an amount ranging from about 0.01 wt % to about 15 wt %, from about 0.05 wt % to about 10 wt %, from about 0.1 wt % to about 5 wt %, and from 0.25 wt % to about 1 wt %. Further, it is preferred, although not necessary, that the cationic polymer is substantially free of carrier particles or coating. This is advantageous as it avoids an extra step and cost associated with the incorporation of these materials.

In a specific embodiment of the present invention, a silicone-derived anti-foaming agent is used in combination with the cationic polymer in a cleaning composition, or preferably a laundry detergent composition. Although not necessary for carrying out the present invention, such silicone-derived anti-foaming agent may further improve the sudsing profile of the cleaning composition.

The silicone-derived anti-foaming agent can be any suitable organosilicones, including, but not limited to: (a) non-functionalized silicones such as polydimethylsiloxane (PDMS); and (b) functionalized silicones such as silicones with one or more functional groups selected from the group consisting of amino, amido, alkoxy, alkyl, phenyl, polyether, acrylate, siliconehydride, mercaptoproyl, carboxylate, sulfate phosphate, quaternized nitrogen, and combinations thereof. In typical embodiments, the organosilicones suitable for use herein have a viscosity ranging from about 10 to about 700,000 CSt (centistokes) at 20° C. In other embodiments, the suitable organosilicones have a viscosity from about 10 to about 100,000 CSt.

Polydimethylsiloxanes (PDMS) can be linear, branched, cyclic, grafted or cross-linked or cyclic structures. In some embodiments, the detergent compositions comprise PDMS having a viscosity of from about 100 to about 700,000 CSt at 20° C. Exemplary functionalized silicones include but are not limited to aminosilicones, amidosilicones, silicone polyethers, alkylsilicones, phenyl silicones and quaternary silicones. A preferred class of functionalized silicones comprises cationic silicones produced by reacting a diamine with an epoxide. One embodiment of the composition of the present invention contains organosilicone emulsions, which comprise organosilicones dispersed in a suitable carrier (typically water) in the presence of an emulsifier (typically an anionic surfactant). In another embodiment, the organosilicones are in the form of microemulsions having an average particle size in the range from about 1 nm to about 150 nm, or from about 10 nm to about 100 nm, or from about 20 nm to about 50 nm.

The silicone-derived anti-foaming agent as mentioned hereinabove can be present in the cleaning composition in an amount ranging from about 0.01% to about 5%, preferably from about 0.1% to about 2%, and more preferably from about 0.2% to about 1%, by total weight of the composition.

Cleaning compositions or laundry detergent compositions of the present invention may comprise one or more surfactants at amounts ranging from about 1% to about 80%, more preferably from about 1% to about 50%, and more preferably from about 5% to about 30% by total weight of the compositions. Detersive surfactants utilized can be of the anionic, nonionic, zwitterionic, amphoteric or cationic type or can comprise compatible mixtures of these types.

Anionic surfactants are preferred. Useful anionic surfactants can themselves be of several different types. For example, non-soap synthetic anionic surfactants are particularly suitable for use herein, which include the water-soluble salts, preferably the alkali metal, and ammonium salts, of organic sulfuric reaction products having in their molecular structure an alkyl group (included in the term "alkyl" is the alkyl portion of acyl groups) containing from about 10 to about 20 carbon atoms and a sulfonic acid or sulfuric acid ester group. Examples of this group of synthetic anionic surfactants include, but are not limited to: a) the sodium, potassium and ammonium alkyl sulfates with either linear or branched carbon chains, especially those obtained by sulfating the higher alcohols ($C_{10}$-$C_{20}$ carbon atoms), such as those produced by reducing the glycerides of tallow or coconut oil; b) the sodium, potassium and ammonium alkylalkoxy sulfates with either linear or branched carbon chains, particularly those in which the alkyl group contains from about 10 to about 20, preferably from about 12 to about 18 carbon atoms, and wherein the alkoxylated chain has, in average, a degree of ethoxylation ranging from about 0.1 to about 5, preferably from about 0.3 to about 4, and more preferably from about 0.5 to about 3; c) the sodium and potassium alkyl benzene sulfonates in which the alkyl group contains from about 10 to about 20 carbon atoms in either a linear or a branched carbon chain configuration, preferably a linear carbon chain configuration; d) the sodium, potassium and ammonium alkyl sulphonates in which the alkyl group contains from about 10 to about 20 carbon atoms in either a linear or a branched configuration; e) the sodium, potassium and ammonium alkyl phosphates or phosphonates in which the alkyl group contains from about 10 to about 20 carbon atoms in either a linear or a branched configuration, f) the sodium, potassium and ammonium alkyl carboxylates in which the alkyl group contains from about 10 to about 20 carbon atoms in either a linear or a branched configuration, and combinations thereof; g) the sodium, potassium and ammonium alkyl ester sulfonates, for example of formula R—CH($SO_3$M)-$CH_2$COOR', or the sodium, potassium and ammonium alkyl ester sulfates, for example of formula R—CH($OSO_3$M)-$CH_2$COOR', where R represents a $C_{10}$-$C_{20}$ and preferably $C_{10}$-$C_{16}$ linear or branched alkyl radical, R' represents a $C_1$-$C_6$ and preferably $C_1$-$C_3$ alkyl radical, and M represents a sodium, potassium or the ammonium cation.

Especially preferred for the practice of the present invention are anionic surfactant systems containing $C_{10}$-$C_{20}$ linear alkyl benzene sulphonates, $C_{10}$-$C_{20}$ linear or branched alkylalkoxy sulfates having an average degree of alkoxylation ranging from about 0.1 to about 5 (preferably from about 0.3 to about 4 and more preferably from about 0.5 to about 3, which is particularly advantageous for improving the sudsing profile of the detergent composition), or mixtures thereof.

More preferably, the surfactant system of the present invention is enriched with $C_{10}$-$C_{20}$ linear or branched alkylalkoxy sulfates (AES), i.e., the AES surfactant(s) are present in an amount that is equal to or greater than any other detersive surfactant contained by the surfactant system, such as the $C_{10}$-$C_{20}$ linear alkyl benzene sulphonates or the nonionic surfactants. Still more preferably, the surfactant system of the present invention is composed of 50% or more, and most preferably 60% or more, by total weight of said surfactant system, of AES surfactant(s), which preferably but not necessarily have an average degree of alkoxylation ranging from about 0.5 to about 3. Without being bound by any theory, it is believed that an alkylalkoxy sulfate-enriched surfactant system can help to further improve the sudsing benefit of the cationic polymer of the present invention.

The anionic surfactants can be provided in the cleaning compositions of the present invention at levels ranging from about 1% to about 80%, more preferably from about 1% to about 50%, and more preferably from about 5% to about 30% by total weight of the compositions.

In one particularly preferred embodiment, the cleaning composition of the present invention is a liquid laundry detergent composition containing from about 1 wt % to about 50 wt % of one or more anionic surfactants selected from the group consisting of $C_{10}$-$C_{20}$ linear alkyl benzene sulphonates, $C_{10}$-$C_{20}$ linear or branched alkylalkoxy sulfates having an average degree of alkoxylation ranging from 0.1 to 5.0, $C_{10}$-$C_{20}$ linear or branched alkyl sulfates, $C_{10}$-$C_{20}$ linear or branched alkyl ester sulfates, $C_{10}$-$C_{20}$ linear or branched alkyl sulphonates, $C_{10}$-$C_{20}$ linear or branched alkyl ester sulphonates, $C_{10}$-$C_{20}$ linear or branched alkyl phosphates, $C_{10}$-$C_{20}$ linear or branched alkyl phosphonates, $C_{10}$-$C_{20}$ linear or branched alkyl carboxylates, and combinations thereof. More preferably, said one or more anionic surfactants are selected from the group consisting of $C_{10}$-$C_{20}$ linear alkyl benzene sulphonates, $C_{10}$-$C_{20}$ linear or branched alkylalkoxy sulfates having an average degree of alkoxylation ranging from about 0.5 to about 3, methyl ester sulfonates with a $C_{10}$-$C_{20}$ linear or branched alkyl group, and combinations thereof, and are present in an amount ranging from about 5 wt % to about 30 wt % of the liquid laundry detergent composition.

Water-soluble salts of the higher fatty acids, i.e., "soaps", are also useful anionic surfactants in the cleaning compositions of the present invention. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap. For example, the cleaning composition can be a liquid laundry detergent composition containing from about 0.1 wt % to about 5 wt %, preferably from about 0.5 wt % to about 4 wt %, more preferably from about 1 wt % to about 3 wt %, of one or more fatty acids and/or alkali salts thereof. Exemplary fatty acids or salts thereof that can be used may be selected from caprylic acid, capric acid, lauric acid, myristic acid, myristoleic acid, palmitic acid, palmitoleic acid, sapienic acid, stearic acid, oleic acid, elaidic acid, vaccenic acid, linoleic acid, linoelaidic acid, α-linoelaidic acid, arachidic acid, arachidonic acid, eicosapentaenoic acid, behenic acid, erucic acid, and docosahexaenoic acid, and salts thereof. Further, it is preferred that the liquid laundry detergent composition of the present invention comprises one or more saturated fatty acids or salts thereof, such as caprylic acid, capric acid, lauric acid, myristic acid, palmitic acid, stearic acid, arachidic acid, behenic acid, and salts thereof. Among the above-listed saturated fatty acids, lauric acid, myristic acid, palmitic acid and salts thereof are particularly preferred.

However, in certain preferred embodiments of the present invention, the cleaning compositions contains fatty acids or salts at a relatively low level, e.g., no more than about 3 wt %, more preferably not more than about 2 wt % or about 1 wt %, and most preferably said cleaning composition is essentially free of fatty acids or salts thereof.

Nonionic surfactants can also be included into the surfactant systems of the present invention, which include those of the formula $R^1(OC_2H_4)_nOH$, wherein $R^1$ is a $C_8$-$C_{18}$ alkyl group or alkyl phenyl group, and n is from about 1 to about 80. Particularly preferred are $C_8$-$C_{18}$ alkyl alkoxylated alcohols having an average degree of alkoxylation from about 1 to about 20. The nonionic surfactants can be provided in the cleaning compositions at levels ranging from about 0.05 wt % to about 20 wt %, preferably from about 0.1 wt % to about 10 wt %, and most preferably from about 1 wt % to about 5 wt %. However, in certain preferred embodiments of the present invention, the cleaning compositions contains nonionic surfactants at a relatively low level, e.g., no more than about 3 wt %, more preferably not more than about 2 wt % or 1 wt %, and most preferably said cleaning composition is essentially free of nonionic surfactants.

Other surfactants useful herein include amphoteric surfactants, zwitterionic surfactants and cationic surfactants. Such surfactants are well known for use in laundry detergents and are typically present at levels from about 0.2 wt %, 0.5 wt % or 1 wt % to about 10 wt %, 20 wt % or 30 wt %.

In a preferred but not necessary embodiment of the present invention, the cleaning composition is a liquid laundry detergent composition containing from about 0.5 wt % to about 20 wt % of one or more amphoteric and/or zwitterionic surfactants.

Preferred amphoteric surfactants are selected from the group consisting of amine oxide surfactants, such as, for example, alkyl dimethyl amine oxide or alkyl amido propyl dimethyl amine oxide, more preferably alkyl dimethyl amine oxide and especially coco dimethyl amino oxide. Amine oxide may have a linear or mid-branched alkyl moiety. Typical linear amine oxides are characterized by a formula $R_1$—$N(R_2)(R_3)$—O, wherein $R_1$ is a $C_{8-18}$ alkyl, and wherein $R_2$ and $R_3$ are independently selected from the group consisting of $C_{1-3}$ alkyls and $C_{1-3}$ hydroxyalkyls, such as methyl, ethyl, propyl, isopropyl, 2-hydroxethyl, 2-hydroxypropyl and 3-hydroxypropyl. As used herein "mid-branched" means that the amine oxide has one alkyl moiety having n1 carbon atoms with one alkyl branch on the alkyl moiety having n2 carbon atoms. The alkyl branch is located on the a carbon from the nitrogen on the alkyl moiety. This type of branching for the amine oxide is also known in the art as an internal amine oxide. The total sum of n1 and n2 is from about 10 to about 24 carbon atoms, preferably from about 12 to about 20, and more preferably from about 10 to about 16. The number of carbon atoms for the one alkyl moiety (n1) should be approximately the same number of carbon atoms as the one alkyl branch (n2) such that the one alkyl moiety and the one alkyl branch are symmetric. As used herein "symmetric" means that |n1−n2| is less than or equal to 5, preferably 4, most preferably from 0 to 4 carbon atoms in at least about 50 wt %, more preferably at least about 75 wt % to about 100 wt %, of the mid-branched amine oxides for use herein. Particularly preferred amphoteric surfactants are $C_{10}$-$C_{14}$ alkyl dimethyl amine oxides.

Preferred zwitterionic surfactants are betaine surfactants, such as, for example, alkyl betaines, alkylamidobetaines, amidazoliniumbetaines, sulfobetaines (also referred to as sultaines) as well as phosphobetaines. A particularly preferred betaine is cocoamidopropylbetaine.

In one particularly preferred embodiment, the liquid laundry detergent composition of the present invention contains: (1) from about 0.25 wt % to about 1 wt % of the cationic polymer, which has a molecular weight of from about 15,000 to about 50,000 Daltons and consists essentially of from 20 mol % to 60 mol % of the first nonionic structural unit which is derived from (meth)acrylamide (AAm), from 10 mol % to 40 mol % of the second cationic structural unit which is derived from diallyl dimethyl ammonium chloride (DADMAC), from 30 mol % to 55 mol % of the third nonionic structural unit which is derived from vinylpyrrolidone (VP), and (iv) from 0 mol % to 10 mol % of the fourth anionic structural unit which is derived from (meth)acrylic acid (AA) or anhydride thereof; and (2) from about 1 wt % to about 50 wt % of one or more anionic surfactants selected from the group consisting of $C_{10}$-$C_{20}$ linear alkyl benzene sulphonates, $C_{10}$-$C_{20}$ linear or branched alkylalkoxy sulfates having an average degree of alkoxylation ranging from about 0.5 to about 3, methyl ester sulfonates with a $C_{10}$-$C_{20}$ linear or branched alkyl group, and combinations thereof. Such liquid laundry detergent composition may further contain from about 0.2 wt % to about 1 wt % of the silicone-derived antifoaming agent.

Additional Laundry Detergent Ingredients

When the cleaning composition of the present invention is a liquid detergent composition as described herein above, it may also contain an external structurant, which may be present in an amount ranging from about 0.001% to about 1.0%, preferably from about 0.05% to about 0.5%, more preferably from about 0.1% to about 0.3% by total weight of the composition. Suitable external structurants include: (i) non-polymeric, crystalline, hydroxyl-containing materials which can form thread-like structuring systems throughout a liquid matrix when they are crystallized within the matrix in situ. Such materials can be generally characterized as crystalline, hydroxyl-containing fatty acids, fatty esters or fatty waxes; and (ii) polymeric structurants such as polyacrylates and derivatives thereof; copolymers of acrylate and methacrylate. A particularly preferred external structurant for the practice of the present invention is hydrogenated castor oil, which is also referred to as trihydroxylstearin and is commercially available under the tradename Thixin®.

The balance of the laundry detergent typically contains from about 5 wt % to about 70 wt %, or about 10 wt % to about 60 wt % adjunct ingredients. Suitable detergent ingredients include: transition metal catalysts; imine bleach boosters; enzymes such as amylases, carbohydrases, cellulases, laccases, lipases, bleaching enzymes such as oxidases and peroxidases, proteases, pectate lyases and mannanases; source of peroxygen such as percarbonate salts and/or perborate salts, preferred is sodium percarbonate, the source of peroxygen is preferably at least partially coated, preferably completely coated, by a coating ingredient such as a carbonate salt, a sulphate salt, a silicate salt, borosilicate, or mixtures, including mixed salts, thereof; bleach activator such as tetraacetyl ethylene diamine, oxybenzene sulphonate bleach activators such as nonanoyl oxybenzene sulphonate, caprolactam bleach activators, imide bleach activators such as N-nonanoyl-N-methyl acetamide, preformed peracids such as N,N-pthaloylamino peroxycaproic acid, nonylamido peroxyadipic acid or dibenzoyl peroxide; suds suppressing systems such as silicone based suds suppressors; brighteners; hueing agents; photobleach; fabric-softening agents such as clay, silicone and/or quaternary ammonium compounds; flocculants such as polyethylene oxide; dye transfer inhibitors such as polyvinylpyrrolidone, poly 4-vinylpyridine N-oxide and/or co-polymer of vinylpyrrolidone and vinylimidazole; fabric integrity components such as oligomers produced by the condensation of imidazole and epichlorhydrin; soil dispersants and soil anti-redeposition aids such as alkoxylated polyamines and ethoxylated ethyleneimine polymers; anti-redeposition components such as polyesters and/or terephthalate polymers, polyethylene glycol including polyethylene glycol substituted with vinyl alcohol and/or vinyl acetate pendant groups; perfumes such as perfume microcapsules, polymer assisted perfume delivery systems including Schiff base perfume/polymer complexes, starch encapsulated perfume accords; soap rings; aesthetic particles including coloured noodles and/or needles; dyes; fillers such as sodium sulphate, although it may be preferred for the composition to be substantially free of fillers; carbonate salt including sodium carbonate and/or sodium bicarbonate; silicate salt such as sodium silicate, including 1.6R and 2.0R sodium silicate, or sodium metasilicate; co-polyesters of di-carboxylic acids and diols; cellulosic polymers such as methyl cellulose, carboxymethyl cellulose, hydroxyethoxycellulose, or other alkyl or alkylalkoxy cellulose, and hydrophobically modified cellulose; carboxylic acid and/or salts thereof, including citric acid and/or sodium citrate; and any combination thereof.

It may also be especially preferred for the laundry detergent powder to comprise low levels, or even be essentially free, of builder. The term "essentially free" means that the composition "comprises no deliberately added" amount of that ingredient. In a preferred embodiment, the laundry detergent composition of the present invention comprises no builder.

Method of Making the Cleaning or Laundry Detergent Composition

Incorporation of the cationic polymer and various other ingredients as described hereinabove into cleaning or laundry detergent compositions of the invention can be done in any suitable manner and can, in general, involve any order of mixing or addition.

For example, the cationic polymer as received from the manufacturer can be introduced directly into a preformed mixture of two or more of the other components of the final composition. This can be done at any point in the process of preparing the final composition, including at the very end of the formulating process. That is, the cationic polymer can be added to a pre-made liquid laundry detergent to form the final composition of the present invention.

In another example, the cationic polymer can be premixed with an emulsifier, a dispersing agent or a suspension agent to form an emulsion, a latex, a dispersion, a suspension, and the like, which is then mixed with other components (such as the silicone-derived anti-foaming agent, detersive surfactants, etc.) of the final composition. These components can be added in any order and at any point in the process of preparing the final composition.

A third example involves mixing the cationic polymer with one or more adjuncts of the final composition and adding this premix to a mixture of the remaining adjuncts.

Methods of Using the Laundry Detergent Composition

The present invention is directed to a method of cleaning fabric, the method comprising the steps of: (i) providing a laundry detergent as described above; (ii) forming a laundry liquor by diluting the laundry detergent with water; (iii) washing fabric in the laundry liquor; and (iv) rinsing the fabric in water, wherein after 2 or less rinses, preferably after 1 rinse, the laundry liquor is substantially free of suds, or at least 75%, preferably at least 85%, more preferably 95%, and even more preferably at least 99% of a surface area of the laundry liquor is free from suds.

The present invention is also directed to a method of saving water during laundering, the method comprising the steps of: (i) providing a laundry detergent as described above; (ii) diluting the cleaning composition with wash water in a container to form a laundry liquor; (iii) washing laundry in the laundry liquor; and (iv) rinsing the laundry, wherein after 2 or less rinses, preferably after 1 rinse, the laundry liquor is substantially free of suds.

The method of laundering fabric may be carried out in a top-loading or front-loading automatic washing machine, or can be used in a hand-wash laundry application, which is particularly preferred in the present invention.

Test Methods

Various techniques are known in the art to determine the properties of the compositions of the present invention comprising the cationic polymer. However, the following assays must be used in order that the invention described and claimed herein may be fully understood.

Test 1: Measurement of Weight Average Molecular Weight (Mw)

The weight-average molecular weight (Mw) of a polymer material of the present invention is determined by Size Exclusion Chromatography (SEC) with differential refractive index detection (RI). One suitable instrument is Agilent® GPC-MDS System using Agilent® GPC/SEC software, Version 1.2 (Agilent, Santa Clara, USA). SEC separation is carried out using three hydrophilic hydroxylation polymethyl methacrylate gel columns (Ultrahydrogel 2000-250-120 manufactured by Waters, Milford, USA) directly joined to each other in a linear series and a solution of 0.1M sodium chloride and 0.3% trifluoroacetic acid in DI-water, which is filtered through 0.22 μm pore size GVWP membrane filter (MILLIPORE, Mass., USA). The RI detector needs to be kept at a constant temperature of about 5-10° C. above the ambient temperature to avoid baseline drift. It is set to 35° C. The injection volume for the SEC is 100 μL. Flow rate is set to 0.8 mL/min. Calculations and calibrations for the test polymer measurements are conducted against a set of 10 narrowly distributed Poly(2-vinylpyridin) standards from Polymer Standard Service (PSS, Mainz Germany) with peak molecular weights of: Mp=1110 g/mol; Mp=3140 g/mol; Mp=4810 g/mol; Mp=11.5 k g/mol; Mp=22 k g/mol; Mp=42.8 k g/mol; Mp=118 k g/mol; Mp=256 k g/mol; Mp=446 k g/mol; and Mp=1060 k g/mol.

Each test sample is prepared by dissolving the concentrated polymer solution into the above-described solution of 0.1M sodium chloride and 0.3% trifluoroacetic acid in DI water, to yield a test sample having a polymer concentration of 1 to 2 mg/mL. The sample solution is allowed to stand for 12 hours to fully dissolve, and then stirred well and filtered through a 0.45 μm pore size nylon membrane (manufactured by WHATMAN, UK) into an auto sampler vial using a 5 mL syringe. Samples of the polymer standards are prepared in a similar manner. Two sample solutions are prepared for each test polymer. Each solution is measured once. The two measurement results are averaged to calculate the Mw of the test polymer.

For each measurement, the solution of 0.1M sodium chloride and 0.3% trifluoroacetic acid in DI water is first injected onto the column as the background. A correction sample (a solution of 1 mg/mL polyethylene oxide with Mp=111.3 k g/mol) is analysed six times prior to other sample measurements, so as to verify repeatability and accuracy of the system.

The weight-average molecular weight (Mw) of the test sample polymer is calculated using the software that accompanies the instrument and selecting the menu options appropriate for narrow standard calibration modelling. A third-order polynomial curve is used to fit the calibration curve to the data points measured from the Poly(2-vinylpyridin) standards. The data regions used for calculating the weight-average molecular weight are selected based upon the strength of the signals detected by the RI detector. Data regions where the RI signals are greater than 3 times the respective baseline noise levels are selected and included in the Mw calculations. All other data regions are discarded and excluded from the Mw calculations. For those regions which fall outside of the calibration range, the calibration curve is extrapolated for the Mw calculation.

To measure the average molecular weight of a test sample containing a mixture of polymers of different molecular weights, the selected data region is cut into a number of equally spaced slices. The height or Y-value of each slice from the selected region represents the abundance (Ni) of a specific polymer (i), and the X-value of each slice from the selected region represents the molecular weight (Mi) of the specific polymer (i). The weight average molecular weight (Mw) of the test sample is then calculated based on the equation described hereinabove, i.e., Mw=($\Sigma$i Ni Mi2)/($\Sigma$i Ni Mi).

Test 2: Qualification of the Monomers by HPLC

Each of the monomers in the cationic polymer is quantified by high pressure liquid chromatography (HPLC) according to the follows:

| | |
|---|---|
| Measuring device: | L-7000 series (Hitachi Ltd.) |
| Detector: | UV detector, L-7400 (Hitachi Ltd.) |
| Column: | SHODEX RSpak DE-413 (product of Showa Denko K. K.) |
| Temperature: | 40° C. |
| Eluent: | 0.1% phosphoric acid aqueous solution |
| Flow Velocity: | 1.0 mL/min |

Test 3: Performance Evaluation (Sudsing Profile Test)

The sudsing profile of the detergent composition herein is measured by employing a suds cylinder tester (SCT). The SCT has a set of 8 cylinders. Each cylinder is typically 60 cm long and 9 cm in diameter and may be together rotated at a rate of 20-22 revolutions per minute (rpm). This method is used to assay the performance of laundry detergent to obtain a reading on ability to generate suds as well as its suds stability and rinse suds performance. The following factors affect results and therefore should be controlled properly: (a) concentration of detergent in solution, (b) water hardness, (c) water temperature of water, (d) speed and number of revolutions, (e) soil load in the solution, and (f) cleanliness of the inner part of the tubes.

The performance is determined by comparing the suds height generated during the washing stage by the laundry detergent containing the cationic polymer of the present invention or a comparative cationic polymer not falling within the scope of the present invention, versus control laundry detergent that does not contain any cationic polymer. The height of suds generated by each test composition is measured by recording the total suds height (i.e., height of suds plus wash liquor) minus the height of the wash liquor alone.

1. Weigh 1.5 grams of product and dissolve it in 300 ml of water with a water hardness of about 16 gpg for at least 15 min to form a solution containing the test product at about 5000 ppm. Dissolve the samples simultaneously.
2. Pour the sample aliquot to the tubes. Put in the rubber stopper and lock the tubes in place.
3. Spin for 10 revolutions. Lock in an upright position. Wait 1 min and check the suds height very quickly (~10 sec) left to right. Record the total suds height (i.e., height of the suds plus wash liquor) and the height of the wash liquor alone. This marks the after 10 revolutions data.
4. Spin for additional 20 revolutions. This marks the after 30 revolutions data. Take recordings from left to right.
5. Spin for 20 revolutions more. This marks the after 50 revolutions data. Take readings from left to right. Repeat this step one more time; thus, the data gathered are for after 70 revolutions.
6. Open the tubes. Add 1 piece of fabric with clay and ¼ piece of fabric with dirty cooking oil (DCO) into each tube. Put in the rubber stopper. Spin for 20 revolutions. This marks the after 90 revolutions data. Take readings. Repeat this step one time; thus, the data gathered are for after 110 revolutions.

The addition of the artificial soil is intended to mimic the real world washing conditions where more soils dissolve into the wash liquor from the fabrics being wash. Therefore, this test is relevant for determining the initial sudsing profile of a composition and its sudsing profile in a washing cycle.

(Note: Preparation of fabric with clay is conducted as follows:
   Disperse 20 g of BJ-clay (clay collected from 15 cm below the earth surface in Beijing, China) into 80 ml of DI water via agitation to make a clay suspension.
   Keep agitating the suspension during the preparation process, while brushing 2 g of such clay suspension onto the center of a 10 cm*10 cm cotton fabric to form a round shape stain (d=5 cm).
   The cotton fabric with clay is left dry at room temperature and then used for the performance evaluation.
   Preparation of fabric with DCO is conducted as follows:
   100 grams of peanut oil is used to fry 20 grams of salty fish for 2 hrs at 150-180° C. to form the dirty cooking oil (DCO).
   Brush 0.6 ml of the DCO onto the center of a 10 cm*10 cm cotton fabric to form a round shape stain (d=5 cm).
   Cut the 10 cm*10 cm cotton fabric into 4 equal pieces and use one for the performance evaluation.)

7. Pour 37.5 ml solution out of the tube gently into beaker and add 262.5 ml of water with desired hardness level into the beaker to make a total of 300 ml ⅛ diluted solution. Dispose the remaining solution in the tube and wash the tube with tap water. Pour the 300 ml ⅛ diluted solution into the same tube.
8. Spin for 20 revolutions. This marks the after 130 revolutions data. Take readings from left to right. Repeat this step one time; thus data gathered are for after 150 revolutions.
9. Pour 150 ml solution out of the tube gently into beaker and add 150 ml water with desired hardness level into the beaker to make a total of 300 ml 1/16 diluted solution. Dispose the remaining solution in the tube and wash the tube with tap water. Pour the 300 mL 1/16 diluted solution into the same tube. Repeat steps 8. Data gathered are for 190 revolutions data.
10. In a typical sudsing profile test, Steps 1-9 are repeated at least once to ensure the test repeatability.
11. Data Analysis: Breakdown of the Suds Category

| | | |
|---|---|---|
| Flush Suds | 10 revolutions data | Flush Suds |
| Suds generation | 30-70 revolutions data | Washing Cycle |
| Suds stability | 90-110 revolutions data | Wash data analysis is focused on Suds stability |
| ⅛ Rinse | 130-150 revolutions data | Rinsing Cycle: Rinse data analysis is focused on Rinse (1:8) |
| 1/16 Rinse | 170-190 revolutions data | Rinsing Cycle: 1/16 Rinse |

Average suds height of different categories described above are calculated by average the height data of each replicate.

Washing Suds Index (WSI) is calculated by the average suds height generated by the control sample ($WSH_C$) during the wash cycle when suds stability is observed (i.e., 90-110 revolutions) divided by that generated by a test sample ($WSH_T$), i.e., containing either a cationic polymer of the present invention or a comparative cationic polymer not within the scope of the present invention, and then converted into a percentage, as follows:

$$\text{Washing Suds Index} = \frac{WSH_T}{WSH_C} \times 100\%.$$

The WSI is indicative of how much suds is generated during the wash cycle by a test sample containing a cationic polymer (either an inventive cationic polymer with the specific monomeric composition and molecular weight as defined hereinabove, or a comparative cationic polymer not falling within the scope of the present invention) that may have adverse impact on the wash suds, in comparison with the suds generated by a control sample that does not contain any of such cationic polymer. Therefore, the higher the WSI percentage, the more suds are generated during wash, and the better the performance.

Rinse Suds Index (RSI) is calculated by the average suds height generated by the control sample ($RSH_C$) during the ⅛ rinse cycle (i.e., 130-150 revolutions) divided by that generated by a test sample ($RSH_T$), and then converted into a percentage, as follows:

$$\text{Rinse Suds Index} = \frac{RSH_T}{RSH_C} \times 100\%.$$

The RSI, on the other hand, is indicative of how much suds is left during the rinse cycle by a test sample containing a cationic polymer (either an inventive cationic polymer with the specific monomeric composition and molecular weight as defined hereinabove, or a comparative cationic polymer not falling within the scope of the present invention) that may be effective in reducing the rinse suds, in comparison with the suds left by a control sample that does not contain any of such cationic polymer. Therefore, the lower the RSI percentage, the more suds reduction is effectuated during rinse, and the better the performance.

An optimal sudsing profile as defined within the meaning of this invention includes a WSI of more than 100% and a RSI of less than 50%, preferably a WSI of more than 105% and a RSI of less than 45%, and more preferably a WSI of more than 110% (i.e., a suds boosting effect during wash) and a RSI of less than 40%.

EXAMPLES

I. Cationic Polymer Examples

Following is a list of exemplary cationic polymers within the scope of the present invention:

TABLE I

| Inventive Polymers | AAm (mol %) | DADMAC (mol %) | VP (mol %) | MW (K Dalton) | Calculated Charge Density (meq/g) |
|---|---|---|---|---|---|
| Polymer 1 | 20 | 27 | 53 | 53.1 | 2.31 |
| Polymer 2 | 37 | 16 | 47 | 22.8 | 1.53 |
| Polymer 3 | 40 | 36 | 23 | 160.9 | 3.21 |
| Polymer 4 | 54 | 14 | 32 | 240.9 | 1.45 |

II. Comparative Tests Showing Sudsing Profiles and Phase Stability of Cationic Polymers with Different AAm/DADMAC/VP Molar Percentages Eight (8) test liquid laundry detergent compositions are prepared, including: (1) a control composition containing no cationic polymer, (2) 4 inventive compositions, each of which containing the same ingredients as the control composition but further including 0.5 wt % of an inventive polymer within the scope of the present invention; and (3) 3 comparative compositions, each of which containing the same ingredients as the control composition but further including 0.5 wt % of a comparative polymer that has AAm/DADMAC/VP molar percentages falling outside of the scope of the present invention. Following is the detailed compositional breakdown of the control composition:

TABLE II

| Ingredients | Wt % |
|---|---|
| C24AE3S Paste | 8.320 |
| HLAS | 5.520 |
| Nonionic 24-7 | 1.210 |
| Citric Acid | 2.000 |
| Fatty acid (DTPK) | 1.210 |
| Subtotal Builder | 3.210 |
| Boric acid | 2.100 |
| DTPA | 0.190 |
| FWA-49 | 0.057 |
| Hexamethylene diamine (ethoxylated, quaternized, sulfated) 70% | 0.460 |
| 1,2 propanediol | 1.210 |
| NaOH | 3.130 |
| Acticide MBS | 0.015 |
| Proxel GXL | 0.001 |
| Silicone emulsion | 0.003 |
| Andromeda | 0.600 |
| Liquitint Blue 297 | 0.002 |
| Water | Balance |
| Total | 100.000 |

Sudsing Profile Test as described hereinabove is carried out for each of these eight (8) test compositions by dissolving each composition in water having a water hardness level of 16 gpg to form a laundering liquor containing 5000 ppm of the test composition. The suds test was repeated twice and the average data was reported. The Wash Suds Index (WSI) and Rinse Suds Index (RSI) of each of the three (3) comparative compositions and four (4) inventive compositions are calculated based on the wash suds volume and rinse suds volume measured for such compositions in comparison with the control composition. Following are the measurement results:

TABLE III

| Polymer in Composition | AAm (mol %) | DAD MAC (mol %) | VP (mol %) | MW (K Dalton) | Charge Density (meq/g) | Wash Suds (cm)* | Rinse Suds (cm)** | WSI (%) | RSI (%) | Phase Stability*** |
|---|---|---|---|---|---|---|---|---|---|---|
| No polymer (Control) | — | — | — | — | NA | 27.4 | 7.4 | 100.0 | 100.0 | Stable |
| Polymer 1 | 20 | 27 | 53 | 53.1 | 2.31 | 31.6 | 3.6 | 115.3 | 48.6 | Stable |
| Polymer 2 | 37 | 16 | 47 | 22.8 | 1.53 | 31.4 | 3.5 | 114.6 | 47.3 | Stable |
| Polymer 3 | 40 | 36 | 23 | 160.9 | 3.21 | 32.2 | 2.7 | 117.5 | 36.5 | Stable |
| Polymer 4 | 54 | 14 | 32 | 240.9 | 1.45 | 29.1 | 2.8 | 106.2 | 37.8 | Stable |
| Comparative Polymer 1 | 30 | 70 | 0 | 81.5 | 5.21 | 26.3 | 4.1 | 96.0 | 55.4 | Phase Separation |

TABLE III-continued

| Polymer in Composition | AAm (mol %) | DAD MAC (mol %) | VP (mol %) | MW (K Dalton) | Charge Density (meq/g) | Wash Suds (cm)* | Rinse Suds (cm)** | WSI (%) | RSI (%) | Phase Stability*** |
|---|---|---|---|---|---|---|---|---|---|---|
| Comparative Polymer 2 | 19 | 57 | 24 | 48.2 | 4.31 | 32.3 | 4.4 | 117.9 | 59.5 | Phase Separation |
| Comparative Polymer 3 | 84 | 16 | 0 | 56.6 | 1.87 | 23.3 | 2.3 | 85.0 | 31.1 | Stable |

*Suds stability measured at 90-110 revolutions.
**First rinse suds measured at 130-150 revolutions.
***Phase Stability is determined herein visually by placing the composition in a transparent glass tube of about 2.5 cm in diameter for about 24 hours after the composition is made. A "Stable" product is visually transparent in the glasstube, while a "Phase Separation" product is visually opaque.

The three (3) comparative polymers contained in the comparative compositions all have AAm/DADMAC/VP molar percentages falling outside of the scope of the present invention. The above data shows that only the inventive polymers with the appropriate AAm/DADMAC/VP molar percentages provide both: (i) optimal sudsing profiles, i.e., having a satisfactory wash suds volume quantified by a WSI of more than 100% and a sufficiently reduced rinse suds volume quantified by a RSI of less than 50%; and (ii) phase stability of the finished products.

III. Comparative Tests Showing Sudsing Profiles of Cationic Polymers with Different Molecular Weights Four (4) test liquid laundry detergent compositions are prepared, based on a control composition containing no cationic polymer, which is the same as that described hereinabove for Example II, including: (1) 2 inventive compositions, each of which containing the same ingredients as the control composition described in Example II hereinabove but further including 0.5 wt % of an inventive polymer having molecular weights within the scope of the present invention; and (2) 2 comparative compositions, each of which containing the same ingredients as the control composition described in Example II hereinabove but further including 0.5 wt % of a comparative polymer that has a molecular weight falling outside of the scope of the present invention.

Sudsing Profile Test as described hereinabove is carried out for each of these four (4) test compositions by dissolving each composition in water having a water hardness level of 16 gpg to form a laundering liquor containing 5000 ppm of the test composition. The suds test was repeated twice and the average data was reported. The Wash Suds (cm) and Rinse Suds (cm) of each of the two (2) comparative compositions and two (2) inventive compositions are summarized as below:

TABLE IV

| Polymer in Composition | AAm (mol %) | DADMAC (mol %) | VP (mol %) | MW (K Dalton) | Charge Density (meq/g) | Wash Suds (cm)* | Rinse Suds (cm)** |
|---|---|---|---|---|---|---|---|
| Polymer 1 | 20 | 27 | 53 | 53.1 | 2.31 | 30.7 | 3.8 |
| Polymer 2 | 37 | 16 | 47 | 53.1 | 1.53 | 31.5 | 2.7 |
| Comparative Polymer 4 | 20 | 27 | 53 | 3.9 | 2.31 | 30.3 | 7.3 |
| Comparative Polymer 5 | 37 | 16 | 47 | 10.2 | 1.53 | 31.0 | 6.4 |

*Suds stability measured at 90-110 revolutions.
**First rinse suds measured at 130-150 revolutions.

The two (2) comparative polymers contained in the comparative compositions have molecular weights falling outside of the scope of the present invention. The above data shows that only the inventive polymers with the appropriate molecular weights provide optimal sudsing profiles, i.e., having both a satisfactory wash suds volume quantified and a sufficiently low rinse suds volume.

IV. Exemplary Laundry Detergent Compositions (A). Heavy Duty Powder Detergents The following heaving duty powder detergents are prepared by mixing the ingredients listed below via conventional processes. Such heavy duty liquid detergents are used to launder fabrics that are then dried by line drying and/or machine drying. Such fabrics may be treated with a fabric enhancer prior to and/or during drying. Such fabrics exhibit a clean appearance and have a soft feel.

TABLE V

| Ingredient | Ex. 1 wt % | Ex. 2 wt % | Ex. 3 wt % |
|---|---|---|---|
| LAS (Non-sulphated anionic surfactant) | 10.0 | 15.0-16.0 | 7.0 |
| Mixture of alkyl sulphate surfactants | 1.5 | 1.5-2 | 1.5 |
| Cationic surfactant | 0.0-1.0 | 0.0-1.5 | 0.0-1.0 |
| Non ionic surfactant | 0.0-1.0 | 0.0-1.5 | 0.0-1.0 |
| Zeolite | 0.0-3.0 | 6.0-10.0 | 0.0-3.0 |
| Polymeric dispersing or soil release agents | 1.0-3.0 | 1.0-4.0 | 1.0-3.0 |
| Bleach and bleach activator | 0.0-5.0 | 4.0-6.0 | 2-3.0 |
| Silicate | 7.0-9.0 | — | 5.0-6.0 |
| Carbonate | 10.0-30.0 | 25.0-35.0 | 15.0-30.0 |
| Sulfate | 30.0-70.0 | 30.0-35.0 | 40.0-70.0 |
| Polymers 1-4 in Table I of Example I | 0.25-1.0 | 0.25-1.0 | 0.25-1.0 |
| Deionized water | Balance to 100 wt % | | |

(B). Heavy Duty Liquid Detergents

The following heaving duty liquid detergents are made by mixing the ingredients listed below via conventional processes. Such heavy duty liquid detergents are used to launder fabrics that are then dried by line drying and/or machine drying. Such fabrics may be treated with a fabric enhancer prior to and/or during drying. Such fabrics exhibit a clean appearance and have a soft feel.

TABLE VI

| Ingredients (wt %) | Example 4 | Example 5 | Example 6 | Example 7 | Example 8 | Example 9 | Example 10 |
|---|---|---|---|---|---|---|---|
| Alkyl ether sulfate (EO = 1-3) | 8-15 | 11-14 | 12.07 | 12.07 | 8.32 | 13.5 | 13.5 |
| Linear alkylbenzene sulfonate | 0-10 | 1-6 | 1.86 | 1.66 | 5.52 | 1.5 | — |
| Amine oxide | 0-2 | 0.5-1 | — | 0.75 | — | — | — |
| Alkyl ethoxylate (EO7) | 0-5 | 1-2 | 1.12 | 0.65 | 1.21 | — | 1.5 |
| Citric acid | 0.1-6 | 1-3 | 1.5-2.5 | 1.5-2.5 | 1.5-2.5 | 1.5-2.5 | 1.5-2.5 |
| Fatty acid (DTPK) | 0.5-3 | 1-1.5 | 1.21 | 1.21 | 1.21 | 1.0 | 1.0 |
| Boric acid | 0-4 | 1-3 | 1.5-2.5 | 1.5-2.5 | 1.5-2.5 | 1.5-2.5 | 1.5-2.5 |
| Polyethyleneimine ethoxylate/propoxylate | 0-3 | 0-2 | — | — | — | 0.5-1.5 | 0.5-1.5 |
| Hexamethylene diamine (ethoxylated, quaternized, sulfated) | 0-1 | 0-0.5 | 0-0.5 | 0-0.5 | 0-0.5 | — | — |
| DTPA | 0-0.5 | 0.1-0.3 | 0.1-0.3 | 0.1-0.3 | 0.1-0.3 | 0.1-0.3 | 0.1-0.3 |
| Fluorescent whitening agent | 0-0.1 | 0.02-0.1 | 0.05-0.1 | 0.05-0.1 | 0.05-0.1 | 0.05-0.1 | 0.05-0.1 |
| Propylene glycol | 0-3 | 1-2 | 1-2 | 1-2 | 1-2 | 1-2 | 1-2 |
| NaOH | 0-5 | 1-4 | 2-3 | 2-3 | 3-3.5 | 2.5-3 | 2.5-3 |
| Polymers 1-4 in Table I of Example I | 0.05-1 | 0.1-0.5 | 0.125-0.25 | 0.125-0.25 | 0.1-0.5 | 0.5 | 0.5 |
| Water and miscellaneous | Balance | Balance | Balance | Balance | Balance | Balance | Balance |
| Total | 100 | 100 | 100 | 100 | 100 | 100 | 100 |

TABLE VII

| Ingredient (wt %) | Ex. 11 | Ex. 12 | Ex. 13 | Ex. 14 | Ex. 15 | Ex. 16 | Ex. 17 | Ex. 18 |
|---|---|---|---|---|---|---|---|---|
| Alkyl ether sulfate (EO = 1-3) | 0-12 | 2-10 | 2.1 | 9 | 12 | 8.0 | 2.9 | — |
| Linear alkylbenzene sulfonate | 0-20 | 1-3 | 2.0 | — | 2.8 | 6.2 | 5.6 | 17.7 |
| Alkyl ethoxylate (EO = 7 or 9) | 3-15 | 6-12 | 12.0 | 6 | 4.9 | 7.7 | 7.1 | — |
| Alkyl ethoxylate (C12,14,16 EO20-25 PO1-2) | 0-55 | — | — | — | — | — | — | 51.4 |
| Citric acid | 0.5-6 | 1-3 | 1-3 | 1-3 | — | 1.6 | 1.9 | — |
| Fatty acids | 0-4 | 0.5-2 | 1.0 | 1.0 | 1.2 | 1.9 | 1.0 | 3.5 |
| Boric acid | 0-5 | 1-3 | 1-3 | 1-3 | — | — | — | — |
| Calcium and sodium formate | — | — | — | — | 2.2 | — | — | — |
| Glycerine | — | — | — | — | 2.0 | — | — | — |
| Polyethyleneimine ethoxylate/propoxylate | 0-3 | 0.5-2 | 0.5-2 | 0.5-2 | — | — | — | — |
| Hexamethylene diamine (ethoxylated, quaternized, sulfated) | 0-1 | 0-0.5 | 0-0.5 | 0-0.5 | — | — | — | — |
| Polyacrylate | 0-2 | — | — | — | 1.0 | 0.1 | 0.1 | — |
| DTPA | 0-0.5 | 0.1-0.2 | 0.1-0.2 | 0.1-0.2 | — | — | — | 0.06 |
| Diethylene triamine penta methylene phosphonic acid | 0-0.5 | — | — | — | 0.25 | — | — | — |
| Fluorescent whitening | 0-0.2 | 0.05-0.1 | 0.05-0.1 | 0.05-0.1 | — | 0.06 | 0.17 | — |
| Propylene glycol | 0-5 | 1-2 | 1-2 | 1-2 | — | — | — | — |
| Butyl carbitol | 0-15 | — | — | — | — | — | — | 11.4 |
| Ethanolamine | 0-5 | — | — | — | — | 1.2 | — | 4.8 |
| NaOH | 0-5 | 0-5 | 2.0 | 2.8 | 1.6 | 1.9 | 1.4 | — |
| Polymers 1-4 in Table I of Example I | 0.05-1 | 0.1-0.5 | 0.5 | 0.5 | 0.1-0.5 | 0.1-0.5 | 0.1-0.5 | 0.1-0.5 |
| Water and miscellaneous | Balance | Balance | Balance | Balance | Balance | Balance | Balance | Balance |
| Total | 100 | 100 | 100 | 100 | 100 | 100 | 100 | 100 |

TABLE VIII

| Ingredient (wt %) | Example 19 | Example 20 | Example 21 | Example 22 | Example 23 |
|---|---|---|---|---|---|
| Alkyl ether sulfate (EO = 1-3) | 0-9 | 0-3 | 1.5 | 1.5 | — |
| Linear alkylbenzene sulfonate | 5-20 | 10-15 | 12.0 | 13.5 | 13.5 |
| Alkyl ethoxylate (EO = 7 or 9) | 0-9 | 0-6 | 1.5 | — | 1.5 |
| Citric acid | 0.5-6 | 1-3 | 1-3 | 1-3 | 1-3 |
| Fatty acid | 0-3 | 0.5-2 | 1.0 | 1.0 | 1.0 |
| Boric acid | 0-5 | 1-3 | 1-3 | 1-3 | 1-3 |
| Polyethyleneimine ethoxylate/propoxylate | 0-2 | 0.5-1.5 | 0.5-1.5 | 0.5-1.5 | 0.5-1.5 |
| Hexamethylene diamine (ethoxylated, quaternized, sulfated) | 0-1 | 0.3-0.5 | 0.3-0.5 | 0.3-0.5 | 0.3-0.5 |
| DTPA | 0-0.5 | 0.1-0.25 | 0.1-0.25 | 0.1-0.25 | 0.1-0.25 |
| Fluorescent whitening agent | 0-0.2 | 0.05-0.1 | 0.05-0.1 | 0.05-0.1 | 0.05-0.1 |
| Propylene glycol | 0-12 | 4-10 | 4-10 | 4-10 | 4-10 |
| NaOH | 0-5 | 1-4 | 1-4 | 1-4 | 1-4 |
| Polymers 1-4 in Table I of Example I | 0.05-1 | 0.1-0.5 | 0.5 | 0.5 | 0.25 |
| Water and miscellaneous | Balance | Balance | Balance | Balance | Balance |
| Total | 100 | 100 | 100 | 100 | 100 |

TABLE IX

| Ingredient (wt %) | Ex. 24 | Ex. 25 | Ex. 26 | Ex. 27 | Ex. 28 | Ex. 29 |
|---|---|---|---|---|---|---|
| Alkyl ether sulfate (EO = 1-3) | 8-10 | 6-8 | 5-7 | 2-4 | 2-3 | 1-1.5 |
| Linear alkylbenzene sulfonate | 6-7 | 8-10 | 5-7 | 8-10 | 6-8 | 9-11 |
| Amine Oxide | — | — | 0.3-0.7 | — | — | — |
| Alkyl ethoxylate (EO = 7 or 9) | 1-1.5 | 0.5-1 | 4-5 | 3-5 | 5-6 | 6-7 |
| Citric acid | 1.5-2 | 1-2 | 1-1.5 | 1.5-2.5 | 2.5-3 | 3-3.5 |
| Fatty acid | 1-1.5 | 1-1.5 | 1-1.5 | 1-1.5 | 3-3.5 | 2-3 |
| Enzymes | 0.5-1 | — | 0.2-0.5 | — | 0.3-0.5 | 0.5-1 |
| Boric acid | 1.5-2.5 | 1.5-2.5 | 1.5-2.5 | 1.5-2.5 | 1-1.5 | — |
| Calcium and sodium formate | — | — | — | — | — | 0.1-0.3 |
| Hexamethylene diamine (ethoxylated, quaternized, sulfated) | 0.25-0.75 | 0.25-0.75 | 0.25-0.75 | — | — | 0.25-0.75 |
| Polyethyleneimine ethoxylate/propoxylate | — | — | 0.5-2 | 0.5-2 | 0.5-2 | — |
| Ethyleneglycol/Vinylacetate copolymer | — | — | — | — | — | 1-1.5 |
| DTPA | 0.1-0.5 | 0.1-0.2 | 0.1-0.2 | 0.1-0.2 | — | — |
| Diethylene triamine penta methylene phosphonic acid | — | — | — | — | 0.2-0.5 | 0.2-0.5 |
| Fluorescent whitening agent | 0.05-0.1 | 0.05-0.1 | 0.05-0.1 | 0.05-0.1 | 0.05-0.1 | 0.05-0.1 |
| Ethanol/Propylene glycol | 2-3 | 2-3 | 2-3 | 1-2 | 1-2 | 1-3 |
| Ethanolamine | — | — | — | — | 0.75-1 | 0.2-0.5 |
| NaOH | 3-4 | 2-3 | 2-3 | 2.5-4 | 2.5-4 | — |
| NaCS | — | — | 0.1-0.5 | — | 2-3 | 1-2 |
| Polymers 1-4 in Table I of Example I | 0.05-1 | 0.1-0.5 | 0.5 | 0.5 | 0.1-0.5 | 0.25 |
| Water and miscellaneous | Balance | Balance | Balance | Balance | Balance | Balance |
| Total | 100 | 100 | 100 | 100 | 100 | 100 |

(C). Fabric Enhancers

Fabric enhancer compositions may be prepared by mixing together the ingredients listed in the proportions shown:

TABLE X

| Ingredient | Ex. 30 | Ex. 31 | Ex. 32 wt % | Ex. 33 | Ex. 34 |
|---|---|---|---|---|---|
| FSA | 12.0 | 21.0 | 18.0 | 14.0 | 12.0 |
| Low Mw alcohol | 1.95 | 3.0 | 3.0 | 2.28 | 2.28 |
| Rheology modifier | 1.25 | — | 0.2 | — | 0.2 |
| Perfume oil | 1.50 | 2.3 | 2.0 | 1.50 | 1.50 |
| Perfume encapsulation | 0.6 | 0.3 | 0.4 | — | 0.15 |
| Phase Stabilizing Polymer | 0.25 | — | — | 0.142 | 0.25 |
| Calcium Chloride | 0.10 | 0.12 | 0.1 | 0.45 | 0.55 |
| DTPA | 0.005 | 0.005 | 0.005 | 0.005 | 0.005 |
| Preservative (ppm) | | | 5 ppm | | |
| Antifoam | 0.015 | 0.15 | 0.11 | 0.011 | 0.011 |
| Polyethylene imines | 0.15 | 0.05 | — | 0.1 | — |
| Polymers 1-4 in Table I of Example I | 1.56 | 2.6 | 5.25 | 5.25 | 4.2 |
| Stabilizing Surfactant | — | — | 0.5 | 0.2 | 0.2 |

TABLE X-continued

| Ingredient | Ex. 30 | Ex. 31 | Ex. 32 wt % | Ex. 33 | Ex. 34 |
|---|---|---|---|---|---|
| Organosiloxane polymer | 5 | — | — | — | — |
| Amino-functional silicone | — | — | — | — | 5 |
| Dye (ppm) | 40 | 11 | 30 | 40 | 40 |
| Ammonium Chloride | 0.10 | 0.12 | 0.12 | 0.10 | 0.10 |
| HCl | 0.010 | 0.01 | 0.10 | 0.010 | 0.010 |
| Deionized Water | Balance to 100 wt % | | | | |

(D). Rinse Additive

Rinse additive compositions may be prepared by mixing together the ingredients listed in the proportions shown:

TABLE XI

| Ingredient | % wt |
|---|---|
| Structure material | 0-1.0 |
| Polymers 1-4 in Table I of Example I | 0.01-15 |
| Dye | 0-0.01 |
| Perfume oil | 0-1.0 |
| Preservative | 0-0.2 |
| Deionized Water | Balance to 100 wt % |

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laundry detergent composition, comprising an effective amount of a cationic polymer for sudsing profile optimization, said cationic polymer comprising:
   (i) from about 10 mol % to about 70 mol % of a first nonionic structural unit derived from about (meth) acrylamide (AAm);
   (ii) from about 5 mol % to about 40 mol % of a second cationic structural unit;
   (iii) from about 5 mol % to about 60 mol % of a third nonionic structural unit that is different from the first nonionic structural unit, wherein the third nonionic structural unit is derived from a monomer selected from the group consisting of vinylpyrrolidone (VP), vinyl acetate, vinyl alcohol, vinyl formamide, vinyl acetamide, vinyl alkyl ether, vinyl pyridine, vinyl imidazole, vinyl caprolactam, and combinations thereof;
   (iv) optionally, from about 0 mol % to about 20 mol % of at least one additional structural unit that is different from the first, second and third structural unit, wherein the total mol % of (i)-(iv) adds up to 100 mol %, and wherein said cationic polymer is characterized by a molecular weight (Mw) ranging from about 20,000 to about 500,000 Daltons and is substantially free of any silicone-derived structural unit.

2. The laundry detergent composition of claim 1, further comprising from about 1 wt % to about 50 wt % of one or more anionic surfactants selected from the group consisting of $C_{10}$-$C_{20}$ linear alkyl benzene sulphonates, $C_{10}$-$C_{20}$ linear or branched alkylalkoxy sulfates having an average degree of alkoxylation ranging from about 0.1 to about 5.0, $C_{10}$-$C_{20}$ linear or branched alkyl sulfates, $C_{10}$-$C_{20}$ linear or branched alkyl ester sulfates, $C_{10}$-$C_{20}$ linear or branched alkyl sulphonates, $C_{10}$-$C_{20}$ linear or branched alkyl ester sulphonates, $C_{10}$-$C_{20}$ linear or branched alkyl phosphates, $C_{10}$-$C_{20}$ linear or branched alkyl phosphonates, $C_{10}$-$C_{20}$ linear or branched alkyl carboxylates, and combinations thereof.

3. The laundry detergent composition of claim 1, wherein the second cationic structural unit in the cationic polymer is derived from a monomer selected from the group consisting of diallyl dimethyl ammonium salts (DADMAS), N,N-dimethyl aminoethyl acrylate, N,N-dimethyl aminoethyl methacrylate (DMAM), [2-(methacryloylamino)ethyl]trimethylammonium salts, N,N-dimethylaminopropyl acrylamide (DMAPA), N,N-dimethylaminopropyl methacrylamide (DMAPMA), acrylamidopropyl trimethyl ammonium salts (APTAS), methacrylamidopropyl trimethylammonium salts (MAPTAS), quaternized vinylimidazole (QVi), and combinations thereof.

4. The laundry detergent composition of claim 1, wherein said at least one additional structural unit comprises a fourth anionic structural unit, which is present in said cationic polymer in an amount ranging from 0 mol % to about 10 mol %.

5. The laundry detergent composition of claim 4, wherein the cationic polymer comprises:
   (i) from about 15 mol % to about 60 mol % of the first nonionic structural unit;
   (ii) from about 10 mol % to about 40 mol % of the second cationic structural unit;
   (iii) from about 20 mol % to about 55 mol % of the third nonionic structural unit; and
   (iv) from 0 mol % to about 10 mol % of the fourth anionic structural unit.

6. The laundry detergent composition of claim 4, wherein the cationic polymer consists essentially of:
   (i) from about 15 mol % to about 60 mol % of the first nonionic structural unit;
   (ii) from about 10 mol % to about 40 mol % of the second cationic structural unit;
   (iii) from about 20 mol % to about 55 mol % of the third nonionic structural unit; and
   (iv) from 0 mol % to about 10 mol % of the fourth anionic structural unit.

7. The laundry detergent composition of claim 1, wherein the molecular weight (Mw) of the cationic polymer ranges from about 20,000 to about 250,000 Daltons.

8. The laundry detergent composition of claim 1, wherein said cationic polymer is present in said composition an amount from about 0.01 wt % to about 15 wt %.

9. The laundry detergent composition of claim 1, characterized by: (1) a Wash Suds Index (WSI) of more than 100%; and (2) a Rinse Suds Index (RSI) of less than 50%.

10. The laundry detergent composition of claim 1, further comprising a silicone-derived anti-foaming agent, which is present in an amount ranging from about 0.01% to about 5% by total weight of the composition.

11. The laundry detergent composition of claim 1, further comprising a silicone-derived anti-foaming agent, which is present in an amount ranging from about 0.1% to about 2% by total weight of the composition.

12. The laundry detergent composition of claim 1, further comprising a silicone-derived anti-foaming agent, which is present in an amount ranging from about 0.2% to about 1% by total weight of the composition.

13. The laundry detergent composition of claim 1, further comprising from about 0.05 wt % to about 5 wt % of one or more nonionic surfactants selected from the group consisting of $C_8$-$C_{18}$ alkyl alkoxylated alcohols having an average degree of alkoxylation from 1 to 20 and combinations thereof.

14. A method of hand washing an article, the method comprising the steps of:
    (i) providing a laundry detergent composition according to claim 1;
    (ii) forming a laundry liquor by diluting the laundry detergent with water;
    (iii) hand washing fabric in the laundry liquor; and
    (iv) rinsing the fabric in water.

15. A liquid laundry detergent composition, comprising:
    (1) from about 0.2 wt % to about 1 wt % of a cationic polymer having a molecular weight (Mw) of from about 20,000 to about 250,000 Daltons, said cationic polymer consisting essentially of: (i) from about 15 mol % to about 60 mol % of a first nonionic structural unit derived from (meth)acrylamide (AAm); (ii) from about 10 mol % to about 40 mol % of a second cationic structural unit derived from diallyl dimethyl ammonium chloride (DADMAC); (iii) from about 20 mol % to about 55 mol % of a third nonionic structural unit derived from vinylpyrrolidone (VP); and (iv) from 0 mol % to about 10 mol % of a fourth anionic structural unit derived from (meth)acrylic acid (AA) or anhydride thereof, wherein said cationic polymer is substantially free of any silicone-derived structural unit; and
    (2) from about 1 wt % to about 50 wt % of anionic surfactants selected from $C_{10}$-$C_{20}$ linear or branched alkylalkoxy sulfates having an average degree of alkoxylation ranging from about 0.5 to about 3.

16. A method of hand washing an article, the method comprising the steps of:
    (i) providing a laundry detergent composition according to claim 10;
    (ii) forming a laundry liquor by diluting the laundry detergent with water;
    (iii) hand washing fabric in the laundry liquor; and
    (iv) rinsing the fabric in water.

17. The laundry detergent composition of claim 3, wherein the second cationic structural unit in the cationic polymer is derived from a monomer selected from the group consisting of diallyl dimethyl ammonium salts (DADMAS).

18. The laundry detergent composition of claim 1, wherein the third nonionic structural unit in the cationic polymer is derived from vinylpyrrolidone (VP).

19. The laundry detergent composition of claim 4, wherein the fourth anionic structural unit is derived from vinyl carboxylic acids and anhydrides thereof.

20. The laundry detergent composition of claim 17, wherein the fourth anionic structural unit is derived from a monomer selected from the group consisting of (meth)acrylic acid, (meth)acrylic anhydride, maleic acid, maleic anhydride, and combinations thereof.

\* \* \* \* \*